United States Patent [19]

Fasullo et al.

[11] Patent Number: 5,861,734
[45] Date of Patent: Jan. 19, 1999

[54] CONTROL ARCHITECTURE FOR INTERLEAVED CONVERTERS

[75] Inventors: Greg H. Fasullo, Dallas; Jin He, Plano; Mark Elliott Jacobs, Dallas; Yimin Jiang, Plano, all of Tex.

[73] Assignee: Lucent Technologies, Inc., Murray Hill, N.Y.

[21] Appl. No.: 950,335

[22] Filed: Oct. 14, 1997

[51] Int. Cl.[6] .................................. G05F 1/10; G05F 1/56
[52] U.S. Cl. ............................................ 323/222; 323/282
[58] Field of Search ........................................ 323/222, 282; 363/16, 17, 20, 21, 97, 98, 131, 132

[56] References Cited

U.S. PATENT DOCUMENTS

| | | | |
|---|---|---|---|
| 5,008,795 | 4/1991 | Parsley et al. | 363/20 |
| 5,302,862 | 4/1994 | Steigerwald | 307/282 |
| 5,477,132 | 12/1995 | Canter et al. | 323/282 |
| 5,508,903 | 4/1996 | Alexndrov | 363/16 |

*Primary Examiner*—Matthew V. Nguyen
*Attorney, Agent, or Firm*—Locke Purnell Rain Harrell

[57] ABSTRACT

A control system for an converter circuit using two interleaved boost circuits is described which uses a single PWM controller to control the switches in both of the interleaved boost circuits. A voltage feedback control circuit monitors the output voltage of the converter circuit and sends that information to the PWM controller. A current sensing circuit is provided that senses the current in each of the boost converters. The current sensed in the current sensing circuit is converted to a voltage and used in conjunction with the voltage information from voltage feedback control circuit by the single PWM controller to regulate both of the boost converter switches. By regulating the boost converter switches, the single PWM controller is able to ensure proper synchronization and current sharing while tightly regulating the output voltage and improving the input power factor of the converter circuit.

14 Claims, 3 Drawing Sheets

CONTROL ARCHITECTURE FOR INTERLEAVED CONVERTERS

This invention relates to control architectures for interleaved converters. More particularly, the invention relates to an improved control architecture which uses a single pulse width molulation ("PWM") controller to regulate one voltage loop and two current loops for an interleaved converter with a maximum switching duty cycle of 50%.

BACKGROUND OF THE INVENTION

Generating clean stable dc power for sensitive equipment from an ac source, single phase or three phase, is a common problem. The most simple solutions utilize bridge rectifier circuits and large filtering capacitors. Simple bridge rectifiers, however, have input current waveforms that are not sinusoidal and are highly distorted, resulting in very poor input power factors and total harmonic distortion. The use of a boost converter having a single switch, or multiple parallel switches, between the bridge rectifier and the dc output can significantly improve the input power factor and reduce the total harmonic distortion. The objectives of the boost converter are to shape the input line current to become a square wave which can be done using constant peak current-mode control with a switching duty cycle of less than 50%, and to regulate the output voltage to ensure that it is constant.

It often becomes necessary or desirable, for example with increased power levels, to augment the single boost converter, which has multiple switches connected in parallel, with additional boost converters which are interleaved with the first. The interleaving of two boost converters results in an overall converter size reduction due to the reduced size of the energy-storage boost inductors, differential-mode electro-magnetic interference ("EMI") filters, and the output filter capacitors. Interleaving also effectively increases the switching frequency without increasing the switching losses of power switching devices.

The control scheme of conventional interleaved boost converters for a three-phase, six-diode input bridge, consists of two PWM controllers, each controlling one voltage regulation loop, and one current control loop, which can be either peak current or average current controlled. One of the PWM controllers acts as a master controller and the other acts as a slave controller where the clock of the salve controller is synchronized to the master with the help of additional synchronization circuits.

The problem with this control scheme is that the parameter variation of the synchronization circuit components and other circuit elements will cause the duty cycle of the slave boost converter to be different from that of the master boost converter. Therefore, the two boost converters may operate at different duty cycles and the two boost switchings may not be the expected 180 degrees out of phase. The result is a degradation in the anticipated effect on the input line current ripple cancellation and the output ripple cancellation. Further, the two boost converters will exhibit asymmetrical sharing of the current in addition to the use of more circuit components.

An interleaved boost converter system configured to use a single PWM controller would ensure the proper 180 degrees phase shift between the switching of the two boost switches and would result in symmetrical current sharing, thereby solving the problems in input line current harmonics, output ripple, and the asymmetrical sharing of current in the two boost switches seen with the master/slave controllers of the conventional scheme.

SUMMARY OF THE INVENTION

A control system for a converter circuit using interleaved boost circuits is described which uses a single PWM controller to control the switches in both of the interleaved boost circuits. A voltage feedback control circuit monitors the output voltage of the converter circuit and sends that information to the PWM controller. A current sensing circuit is provided that senses the current in each of the boost converters. The current sensed in the current sensing circuit is converted to a voltage and used by the PWM controller in conjunction with the voltage information from the voltage feedback control circuit to regulate the boost converter switches. By regulating both the boost converter switches the single PWM controller is able to maintain proper synchronization and to tightly regulate the output voltage to improve the input power factor.

The features and advantages of the invention will become more readily understood from the following detailed description taken in conjunction with the appended claims and attached drawing wherein:

DESCRIPTION OF THE PREFERRED EMBODIMENTS

Figure 1:
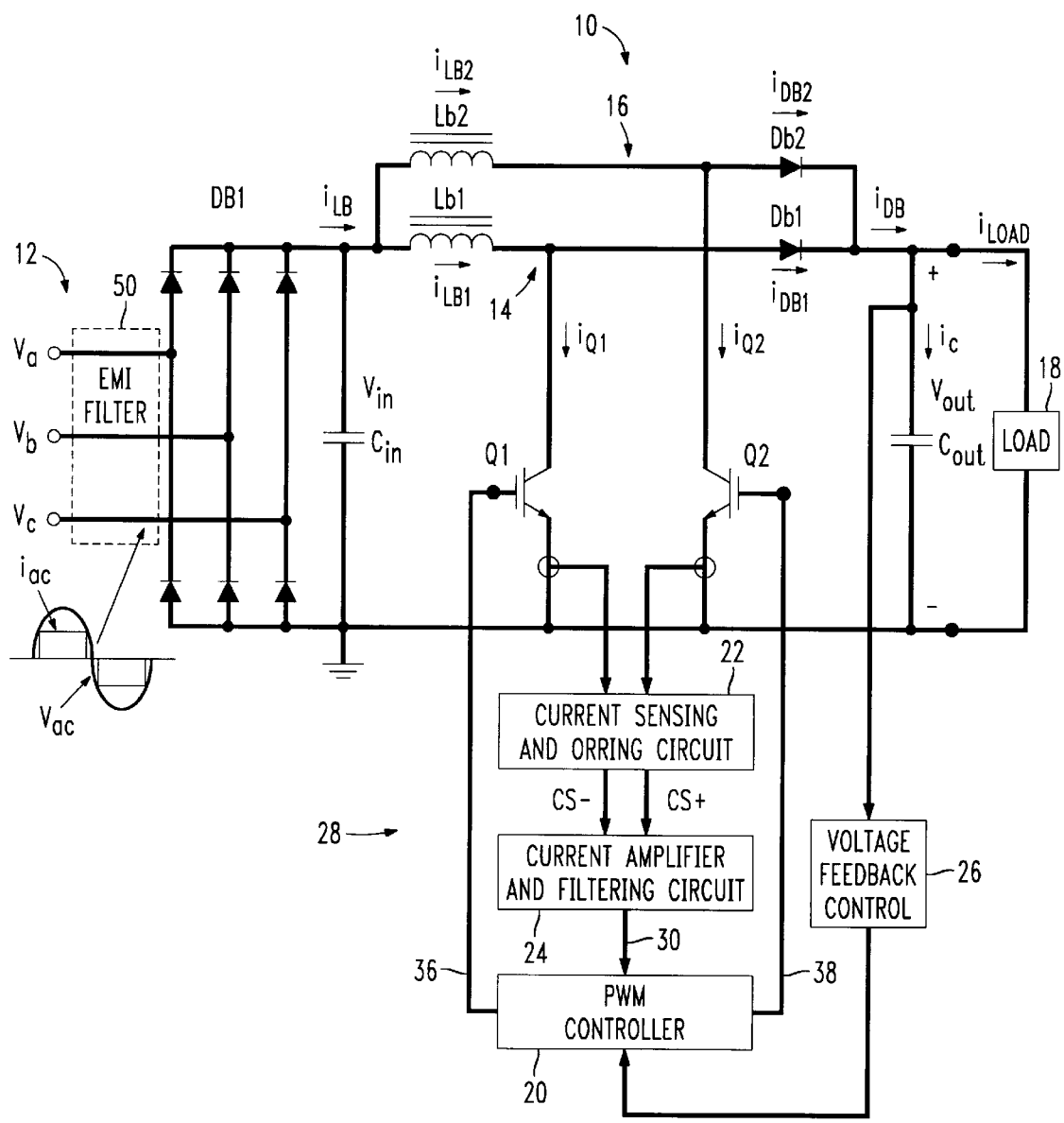
FIG. 1 is a circuit diagram of a three phase six-diode input bridge rectifier using a single controller interleaving boost converters which incorporates the present invention.

Referring to FIG. 1, the preferred embodiment of the present invention with respect to a converter configuration for three-phase, six-diode input bridge interleaving boost converters is shown. Converter 10 has a three-phase alternating current ("ac") input 12 which connects to a six-diode bridge rectifier DB1 via EMI filter 50. Six-diode bridge rectifier DB1 acts with input capacitor $C_{in}$, to convert the ac input voltage and current into a rectified unregulated direct current ("dc") voltage of limited range. This limited dc voltage and current are the input to first boost converter 14, which includes inductor $L_{b1}$, diode $D_{b1}$, and switch transistor Q1, and second boost converter 16 which includes inductor $L_{b2}$, diode $D_{b2}$, and switch transistor Q2. While the input to converter 10 is shown in FIG. 1 to be a three-phase ac input across a six-diode bridge rectifier, any input could be used that produces a dc voltage of limited range.

Switch transistor Q1 of first boost converter 14 controls the current flow through inductor $L_{b1}$, and diode $D_{b1}$ by connecting the junction of inductor $L_{b1}$, and diode $D_{b1}$ to ground when switch transistor Q1 is on. When switch transistor Q1 is on, all current from inductor $L_{b1}$ flows through switch transistor Q1 allowing the energy to be built-up in inductor $L_{b1}$, instead of supplying current to the load through diode $D_{b1}$. When switch transistor Q1 is off, the energy stored in inductor $L_{b1}$ is delivered to the load through diode $D_{b1}$. Similarly, switch transistor Q2 of second boost converter 16 controls the current and energy in inductor $L_{b2}$ and diode $D_{b2}$. Switch transistor Q2 is always turned on 180 degrees out-of-phase, as will be explained, with switch transistor Q1 such that current is supplied to the load alternately from first boost converter 14 and second boost converter 16. The output of first boost converter 14 and second boost converter 16 is connected to output capacitor $C_{out}$ and load 18. Output capacitor $C_{out}$ ensures that load 18 receives a constant output voltage $V_{out}$ and current $i_{Load}$ based on the demands of load 18.

The input current $i_{Lb}$ to the boost converters is divided into current $i_{Lb1}$ and current $i_{Lb2}$ though first boost converter 14 and second boost converter 16, respectively. The output current of the boost converters $i_{Db}$ which is the sum of $i_{Db1}$ and $i_{Db2}$ has its dc component $i_{Load}$ used to supply power to load and its ac component $i_C$ removed by output capacitor $C_{out}$.

Switch transistors Q1 and Q2 are controlled by control system 28 which is formed by PWM controller 20, current sensing and orring circuit 22, current amplifier and filtering circuit 24, and voltage feedback control circuit 26. Current sensing and orring circuit 22 senses and measures current $i_{Q1}$ through switch transistor Q1 and the current $i_{Q2}$ through switch transistor Q2. The current information is converted into a voltage, shown by the potential between line CS+ and line CS−, and filtered and amplified by current amplifier and filtering circuit 24 and then used as current input signal 30 to PWM controller 20. In addition to the current information, feedback from output voltage $V_{out}$ is generated by voltage feedback control circuit 26, which in the preferred embodiment is a common voltage divider circuit.

The two current loops and single voltage loop are regulated by PWM controller 20 according to inputs from current amplifier and filtering circuit 24 and voltage feedback control circuit 26. PWM controller 20, in the preferred embodiment, uses "current mode control" to regulate the output voltage $V_{out}$ and load current $i_{Load}$. "Current mode control" operates by setting a threshold within the PWM controller based on the voltage regulation requirement. When the current sensed in the conducting switch transistor reaches that threshold the switch is turned off. Switch transistors Q1 and Q2, however, are always turned on at fixed instants, with each switch having a 180 degree phase shift with respect to the other.

PWM controller 20 operates at a fixed switching frequency with two 180 degree out-of-phase outputs. The effective interleaving switching frequency is twice the individual boost switching frequency. Since both controller output 36 to switch transistor Q1 and controller output 38 to switch transistor Q2 are generated inside PWM controller 20 from a toggle flip-flop trigger, the phase shift accuracy and the stability between the two outputs are much better than the master/slave controllers using external synchronization circuits. The maximum duty cycle of each of controller output 36 and controller output 38 are limited to a maximum of 50%. Also the use of separate master and slave controllers caused problems in current sharing between the boost converters which again required separate circuitry to overcome. The use of a single PWM controller removes synchronization problems by allowing PWM controller 20 to control both switching transistors Q1 and Q2.

Since the output voltage regulation loop is much slower than the current control loops, the boost output voltage during each switching cycle is almost constant. Therefore, switch transistor Q1 and Q2 will have the same duty cycle and the same peak current switch current as the other. Achieving identical duty cycles for each switch transistor Q1 and Q2 allows for first boost converter 14 and second boost converter 16 to draw the same current, thereby overcoming the current sharing problems of the master/slave controller scheme.

Figure 2:
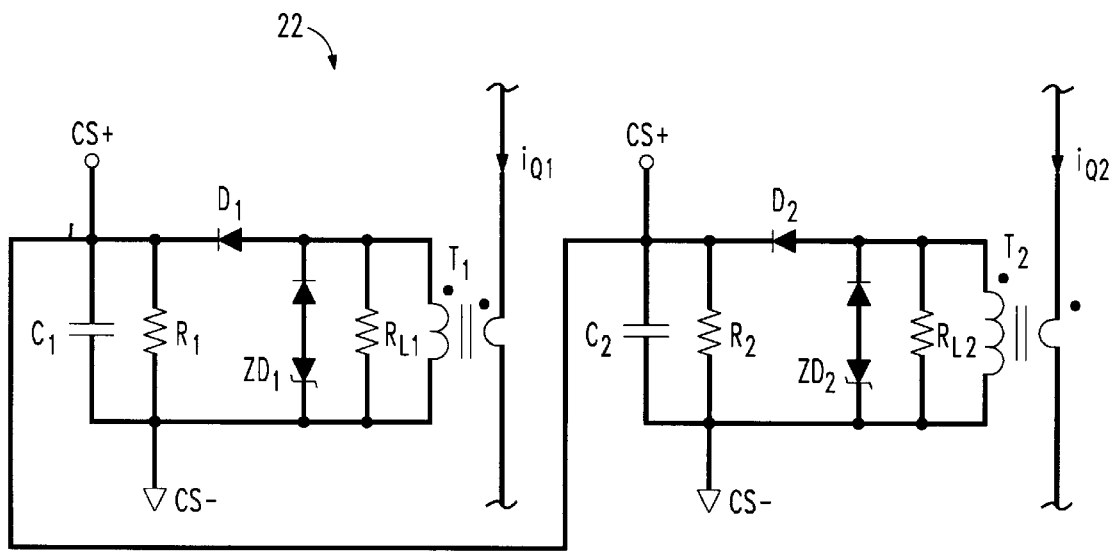
FIG. 2 is a circuit diagram of the current sensing and orring circuit of FIG. 1.
Figure 3:
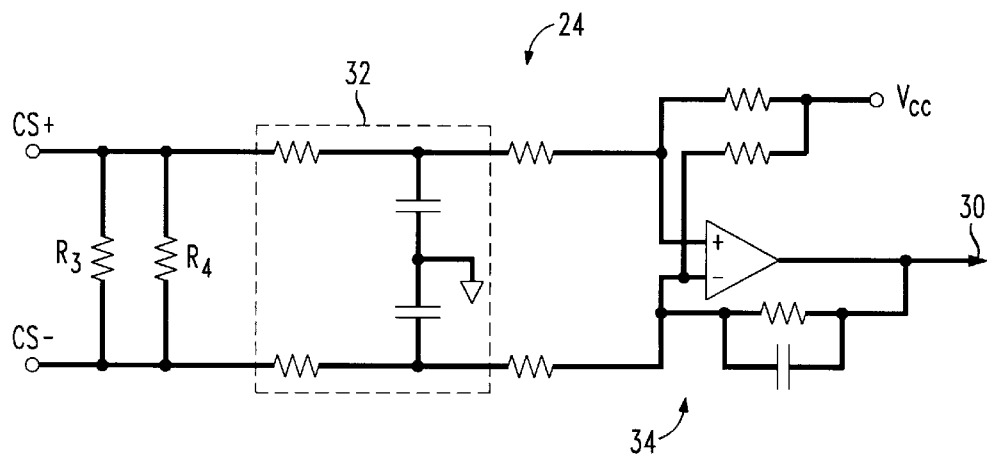
FIG. 3 is a circuit diagram of the current amplifier and filtering circuit of FIG. 1.

Referring now to FIGS. 2 and 3, current sensing and orring circuit 22 and current amplifier and filtering circuit 24 from FIG. 1 can be seen in greater detail. Current sensing and orring circuit 22 uses current sensing transformer T1 and burden resistor RL1 to induce a low level voltage signal in current sensing and orring circuit 22 in response to current $i_{Q1}$ from FIG. 1. An accurate current to voltage conversion is done by resistors R1, R2, R3 and R4 to create a voltage proportional to current $i_{Q1}$. This voltage is the potential between line CS+ and line CS−. Similarly, current sensing transformer T2 and burden resistor RL2 are coupled to converter 10 from FIG. 1 in order to create a low level voltage signal in current sensing and orring circuit 22 proportional to current $i_{Q2}$. This current is again converted to a corresponding voltage by resistors R1, R2, R3 and R4. This voltage again appears across line CS+ and line CS−. The individual current signals generated by current sensing and orring circuit 22 are added together. The two current signals sensed are separated by blocking diodes D1 and D2. The orring function occurs since the maximum duty cycle of each boost switch is less than or equal to 50%, and are 180 degrees out-of-phase. Additionally, transformers T1 and T2 are able to be reset during the off period for the switching transistors. The zener diodes ZD1 and ZD2 are used to clamp the peak transformer reset voltage.

Referring now to FIG. 3, current amplifier and filtering circuit 24 from FIG. 1 is shown in greater detail. Current amplifier and filtering circuit 24 has the voltage of line CS+ and line CS− as an input. The voltage representing the switch current information is filtered by filter subcircuit 32 of current amplifier and filtering circuit 24 and then used as an input to amplifying subcircuit 34. The output of amplifying subcircuit 34 is then sent to PWM controller 20 from FIG. 1 in the form of current input signal 30.

Figure 4:
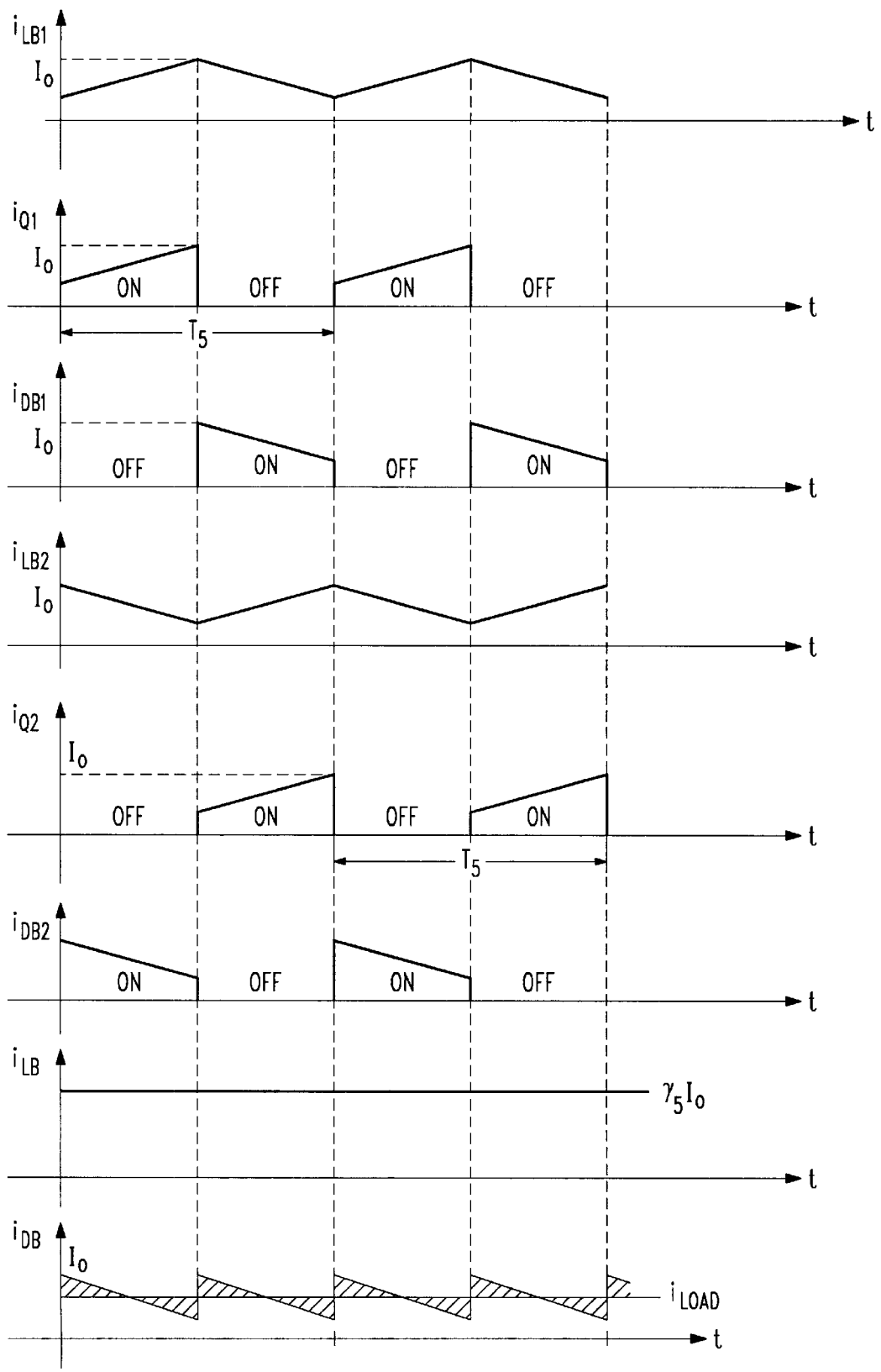
FIG. 4 is a timing diagram for the converter circuit shown in FIG. 1.

FIG. 4 is a timing diagram showing the operation of converter 10 from FIG. 1. Looking at current $i_{Q1}$ during the first half of switching cycle Ts, current $i_{Q1}$ indicates the switch state of switch transistor Q1 from FIG. 1. When switch transistor Q1 is conducting, the input voltage is applied across the boost inductor $L_{b1}$, and current $i_{Lb1}$ rises toward threshold current $I_o$, storing energy in inductor $L_{b1}$ from FIG. 1. During this portion of switching cycle Ts, diode $D_{b1}$ is reversed biased and the diode is not conducting, meaning that first boost converter 14 from FIG. 1 is not providing current to load 18. When switch transistor Q1 is on, switch transistor Q2 from FIG. 1 is off and $i_{Q2}$ is zero. Current $i_{Lb2}$ through inductor $L_{b2}$ becomes current $i_{Db2}$ through diode $D_{b2}$, and decays from its peak current $I_o$ as current is supplied to load 18 by second boost converter 16 since the output voltage $V_{out}$ is higher than the input voltage $V_{in}$.

In the second half of switching cycle Ts, first boost converter 14 supplies current to load while second boost converter 16 recharges. Switch transistor Q1 turns off and switch transistor Q2 turns on causing $i_{Q1}$ to be zero and $i_{Q2}$ to rise toward its peak current $I_o$ with current $i_{Lb2}$ charging inductor $L_{b2}$. Current is supplied to the load 18 from first boost converter 14 as current $i_{Lb1}$ and current $i_{Db1}$ decay from its peak current $I_o$. The same process is repeated for each switching cycle Ts. The timing diagram of FIG. 4 represents the case where the duty cycle of switch transistors Q1 and Q2 is at their maximum of 50%, meaning that the "on" half of the cycle is the same as the "off" half. As previously stated, the "turn-on" instants of switch transistors Q1 and Q2 are fixed, but the "turn-off" instants are determined by PWM controller 20 based on the regulation requirements. The "switch off" time determines the duty cycle of the switches which can be the 50% shown in FIG. 4 or can be less than 50%.

Current $i_{Lb}$, which is the input current to the boost converters, is the sum of current $i_{Lb1}$ and current $i_{Lb2}$. FIG. 4 shows that by using the control scheme of the present invention current $i_{Lb}$ can be made ripple free when the duty cycle is 50%. Current $i_{Db}$, the output current from the boost converters, is the sum of current $i_{Db1}$ and $i_{Db2}$. Current $i_{Db}$'s dc component becomes current $i_{Load}$ supplied to load 18. The ac component of $i_{Db}$, shown as the shaded area becomes current $i_C$ filtered by capacitor $C_{out}$. The smaller current $i_C$ can be made, the less power will be dissipated inside capacitor $C_{out}$, resulting in a longer lifetime for capacitor $C_{out}$.

The control system of the present invention has been described with respect to a specific converter topology. However, the control system of the present invention could be used with any conventional interleaved converter topology without departing from the scope of the present invention.

All of the elements shown in FIGS. 1, 2, and 3 are standard electrical components, and are commonly available. The switches used can be any appropriate switch with a sufficient switching speed, such as power MOSFETs or power IGBTs. The PWM controllers are also well known in the art, and could be any standard PWM controller, such as any of the UC1825 family of PWM control ICs from Unitrode Integrated Circuits, Merrimack, N.H.

The foregoing has outlined preferred and alternative features of the present invention so that those skilled in the art may better understand the detailed description of the invention. Those skilled in the art shall appreciate that they can readily use the disclosed conception and specific embodiment as a basis for designing or modifying other structures for carrying out the same purposes as the present invention. Those skilled in the art should also realize that such equivalent constructions do not depart from the spirit and scope of the present invention in its broadest form as defined by the appended claims.

What is claimed:

1. A control system for a converter circuit producing an output voltage from an input line voltage, the converter circuit including a rectifying circuit, and two interleaved converter circuits, each interleaved converter circuit including a switch, the control system comprising:
    a) a current sensing circuit including two current loops each of the two loops coupled to one of the two interleaved converter circuits to sense the current in each switch;
    b) a voltage feedback control circuit including a voltage loop for sensing the output voltage of the converter circuit; and
    c) a single controller connected to both switches, the single controller responsive to the output voltage sensed by the voltage feedback control circuit and the current in each switch sensed by the current sensing circuit and operative to control the duty cycle of the switches in order to tightly regulate the output voltage and to provide power factor corrections for the input line voltage.

2. The control system of claim 1 wherein the input line voltage is such that the duty cycle of the switches must be 50% or less.

3. The control system of claim 1 wherein the rectifying circuit is a six-diode bridge rectifier connected to a three-phase ac source through an EMI filter circuit and the interleaved converter circuits are interleaved boost converter circuits.

4. The control system of claim 1 wherein the rectifying circuit is a four-diode bridge rectifier connected to a single-phase ac source.

5. The control system of claim 1 wherein the single controller controls the two current loops and voltage loop using current mode control to set a threshold voltage based on the input from the voltage feedback control circuit and to control the switches when the current in the switches reaches the threshold voltage, thereby regulating the output voltage and input line current wave shape.

6. A converter circuit producing an output voltage from a dc input voltage of limited range comprising:
    a) two interleaved converter circuits, each interleaved converter circuit including a switch used to control the operation of the interleaved converter circuit;
    b) an output capacitor connected to the output of the two interleaved converter circuits to store energy and to filter switching ripples from the output voltage;
    c) a current sensing circuit including two current loops, each current loop coupled to one of the interleaved converter circuits to sense the current in each switch;
    d) a voltage feedback control circuit sensing the output voltage of the converter circuit; and
    e) a single controller connected to both switches, the single controller responsive to the output voltage sensed by the voltage feedback control circuit and the current in each switch sensed by the current sensing circuit and operative to control the duty cycle of the switches in order to tightly regulate the output voltage.

7. The control system of claim 6 further comprising a current amplifier and filtering circuit connected between the current sensing circuit and the single controller.

8. The control system of claim 6 wherein the dc input voltage of limited range is such that the duty cycle of the switches can be no greater than 50%.

9. The control system of claim 6 wherein both the interleaved converter circuits are interleaved boost converter circuits.

10. The control system of claim 6 wherein the single controller uses current mode control to set a threshhold voltage based on the input from the voltage feedback control circuit and to control the switches when the current in the switches reaches the threshhold voltage, thereby regulating the output voltage and improving the power factor for the input voltage.

11. A converter circuit producing an output voltage from a dc input voltage of limited range comprising:
    a) two interleaved boost circuits connected in parallel between the dc input voltage and the load, wherein each boost circuit includes an inductor connected to the dc input voltage, a diode connected between the inductor and a load, and a switch connected between the junction of the inductor and the diode and ground, each switch used to control the operation of the boost circuit;
    b) an output capacitor connected to the output of the boost converters to store energy and filter switch ripple from the output voltage;
    c) a current sensing circuit including two current loops magnetically coupled to each of the boost circuits to sense the current in each switch, the current sensing circuit producing a voltage indicative of the current in the boost circuits;
    d) a current amplifying and filtering circuit connected to the current sensing circuit and operable to filter and amplify the voltage indicative of the current in the boost circuits;

e) a voltage feedback control circuit sensing the output voltage of the converter circuit; and f) a single controller connected to both switches, the single controller responsive to the output voltage sensed by the voltage feedback control circuit and the voltage indicative of the current each boost circuit, the single controller operative to control the duty cycle of the switches in order to tightly regulate the output voltage and improve the power factor of the input voltage.

12. The control system of claim 11 wherein the dc input voltage of limited range is such that the duty cycle of the switches can be no greater than 50%.

13. The control system of claim 11 wherein the dc input voltage of limited range is produced from an ac input source connected to rectifier circuit.

14. The control system of claim 11 wherein the single controller uses current mode control to set a threshhold voltage based on the input from the voltage feedback control circuit and to control the switches when the current in the switches reaches the threshhold voltage, thereby regulating the output voltage and improving the power factor for the input voltage.

* * * * *